United States Patent
Idgunji et al.

(10) Patent No.: US 9,645,635 B2
(45) Date of Patent: May 9, 2017

(54) SELECTIVE POWER GATING TO EXTEND THE LIFETIME OF SLEEP FETS

(71) Applicant: NVIDIA CORPORTION, Santa Clara, CA (US)

(72) Inventors: Sachin Idgunji, SAn Jose, CA (US); Tezaswi Raja, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 38 days.

(21) Appl. No.: 14/722,009

(22) Filed: May 26, 2015

(65) Prior Publication Data

US 2016/0349827 A1     Dec. 1, 2016

(51) Int. Cl.
G06F 1/00      (2006.01)
G06F 1/26      (2006.01)
G06F 1/32      (2006.01)

(52) U.S. Cl.
CPC .......... G06F 1/3287 (2013.01); G06F 1/3296 (2013.01); G06F 1/26 (2013.01)

(58) Field of Classification Search
CPC .................................... G06F 1/26; G06F 1/32
See application file for complete search history.

(56) References Cited

U.S. PATENT DOCUMENTS

| | | | | |
|---|---|---|---|---|
| 7,098,689 B1 * | 8/2006 | Tuan | ................ | H03K 19/17784 326/40 |
| 7,295,036 B1 * | 11/2007 | Zaveri | ............. | H03K 19/17728 326/26 |
| 7,401,242 B2 * | 7/2008 | Abernathy | ............ | G06F 1/3228 712/E9.062 |
| 7,498,839 B1 * | 3/2009 | Jenkins, IV | ..... | H03K 19/17748 257/207 |
| 8,866,509 B1 * | 10/2014 | Fu | ........................ | H03K 19/173 326/38 |
| 2005/0251699 A1 * | 11/2005 | Jacobson | .................. | G06F 1/10 713/400 |
| 2007/0273420 A1 * | 11/2007 | Torvi | ................... | H03K 3/3562 327/202 |
| 2008/0231236 A1 * | 9/2008 | Watanabe | ............. | H02J 7/0006 320/150 |
| 2008/0301594 A1 * | 12/2008 | Jiang | ................... | G06F 17/5031 716/134 |
| 2008/0317185 A1 * | 12/2008 | Mueller | ................. | H03D 3/006 375/376 |
| 2013/0009693 A1 * | 1/2013 | Bailey | .................. | G06F 9/3869 327/437 |
| 2013/0099570 A1 * | 4/2013 | Manohar | ................ | H03K 17/20 307/38 |

* cited by examiner

Primary Examiner — Phil Nguyen
(74) Attorney, Agent, or Firm — Artegis Law Group, LLP

(57) ABSTRACT

A power-gating array configured to power gate a logic block includes multiple zones of sleep field-effect transistors (FETs). A zone controller coupled to the power-gating array selectively enables a certain number of zones within the array depending on the voltage drawn by the logic block. When the logic block draws a lower voltage, the zone controller enables a lower number of zones. When the logic block draws a higher voltage, the zone controller enables a greater number of zones. One advantage of the disclosed technique is that sleep FET usage is reduced, thereby countering the effects of FET deterioration due to BTI and TDDB. Accordingly, the lifetime of sleep FETs configured to perform power gating for logic blocks may be extended.

20 Claims, 8 Drawing Sheets

SELECTIVE POWER GATING TO EXTEND THE LIFETIME OF SLEEP FETS

BACKGROUND OF THE INVENTION

Field of the Invention

Embodiments of the present invention relate generally to power gating and, more specifically, to selective power gating to extend the lifetime of sleep FETs.

Description of the Related Art

A conventional computer system is typically configured to implement power gating in order to gate off processing elements when those elements are not in use. Power gating reduces power consumption by preventing leakage that would otherwise draw unnecessary power. A common technique for implementing power gating is to couple a series of sleep field-effect transistors (FETs) between a power source and a logic block that consumes power, or to couple a series of sleep FETs between the logic block and ground. The former arrangement of FETs is known in the art as a "header," while the latter is known as a "footer." A header or footer may be referred to generally herein as a "power-gating array."

When the logic block is operational and consumes power, the sleep FETs within a power-gating array are activated and the logic block can then draw power. When the logic block is not operational and does not consume power, the sleep FETs are deactivated and the logic block cannot draw power, thereby preventing leakage. Since each sleep FET induces a voltage drop between the power source and the logic block (or between the logic block and ground, as the case may be), a power-gating array typically includes many sleep FETs arranged in parallel with one another. With this configuration, the resistance of the array as a whole can be minimized.

Modern computer systems may also be configured to implement dynamic voltage and frequency scaling (DVFS). DVFS is a technique whereby the voltage supplied to a logic block, and the clock frequency of that logic block, can be scaled up or down depending on available power or depending on the power needs of the logic block. When DVFS and power gating are implemented in conjunction with one another, the number of sleep FETs within a power-gating array coupled to the logic block must be carefully chosen to ensure that the voltage drop across the array is small enough to support the maximum operating voltage of the logic block.

However, one problem with this approach is that the sleep FETs within the power-gating array may deteriorate over time due to various physical factors, including bias temperature invariance (BTI) and time-dependent dielectric breakdown (TDDB). Increased activation of sleep FETs typically exacerbates these factors. With power-gating switches that include many parallel sleep FETs, the likelihood that a given FET will deteriorate and fail is increased. If any sleep FETs within the power-gating array deteriorates in performance or ceases to function, the voltage drop across that array may increase, and the array may not be able to support the maximum operating voltage of a logic block coupled thereto.

Accordingly, what is needed in the art is an effective technique for reducing the deterioration of sleep FETs in power-gating arrays.

SUMMARY OF THE INVENTION

One embodiment of the present invention sets forth a computer-implemented method for power gating a logic block, including adjusting an operating voltage associated with the logic block to a first voltage level, enabling a first subset of switching elements included in a set of switching elements that is coupled to the logic block based on the first voltage level, disabling one or more switching elements that are included in the set of switching elements but not included in the first subset of switching elements, and toggling the first subset of switching elements to power gate the logic block between the first voltage level and zero voltage.

One advantage of the disclosed technique is that sleep FET usage within the power-gating array is reduced, thereby countering the effects of FET deterioration due to BTI and TDDB. Accordingly, the lifetime of sleep FETs configured to perform power gating for logic blocks may be extended.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
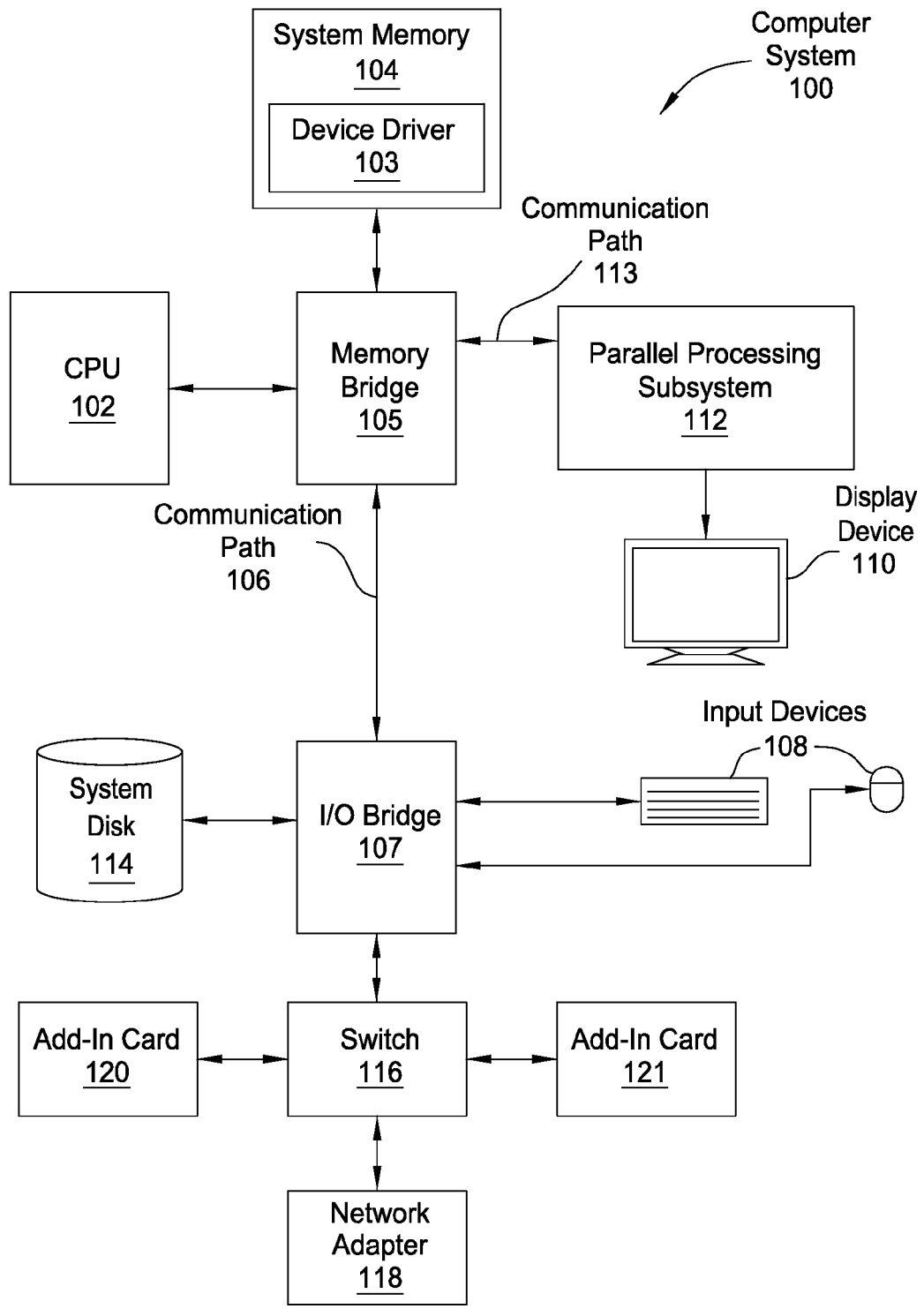
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
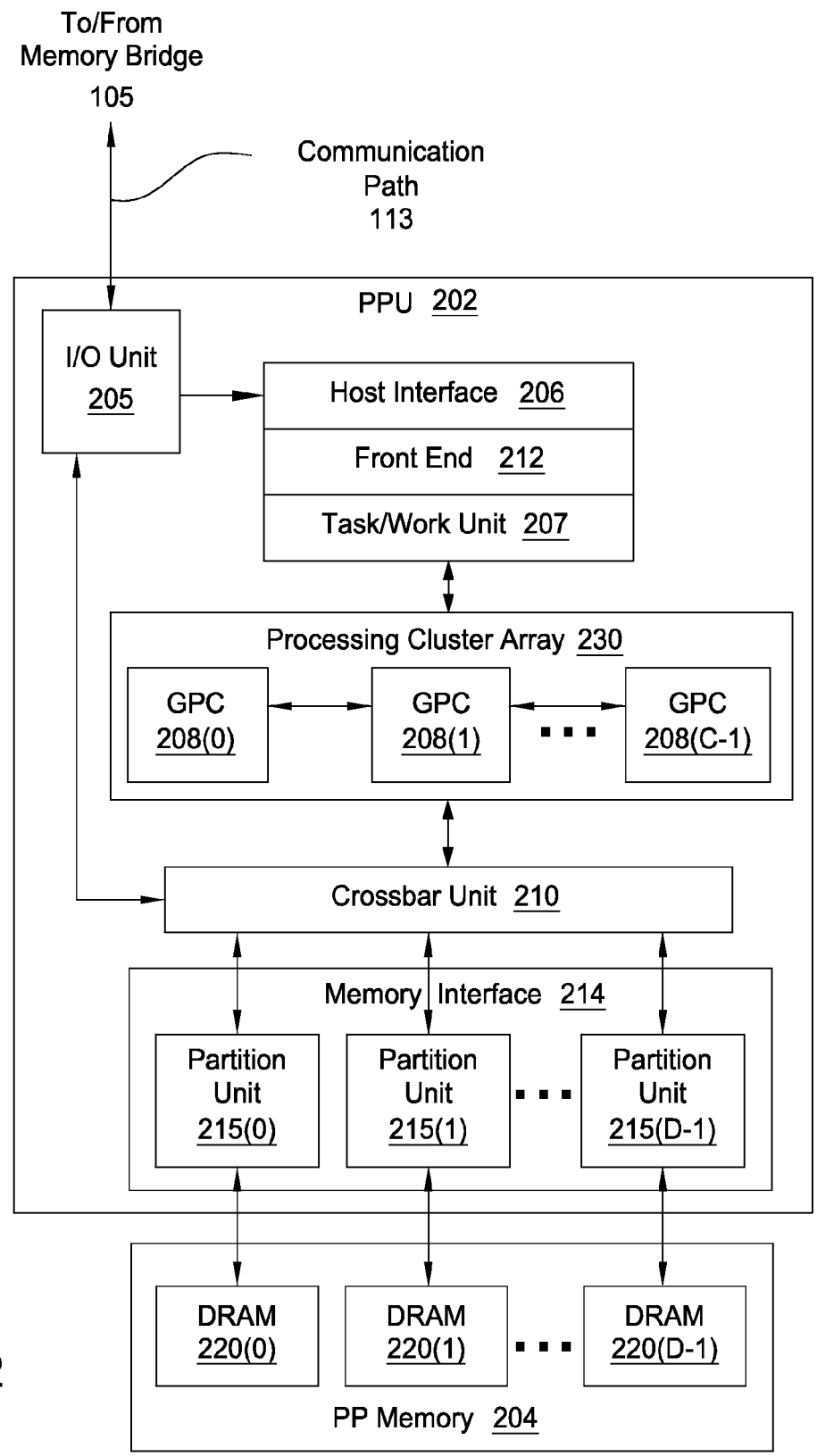
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
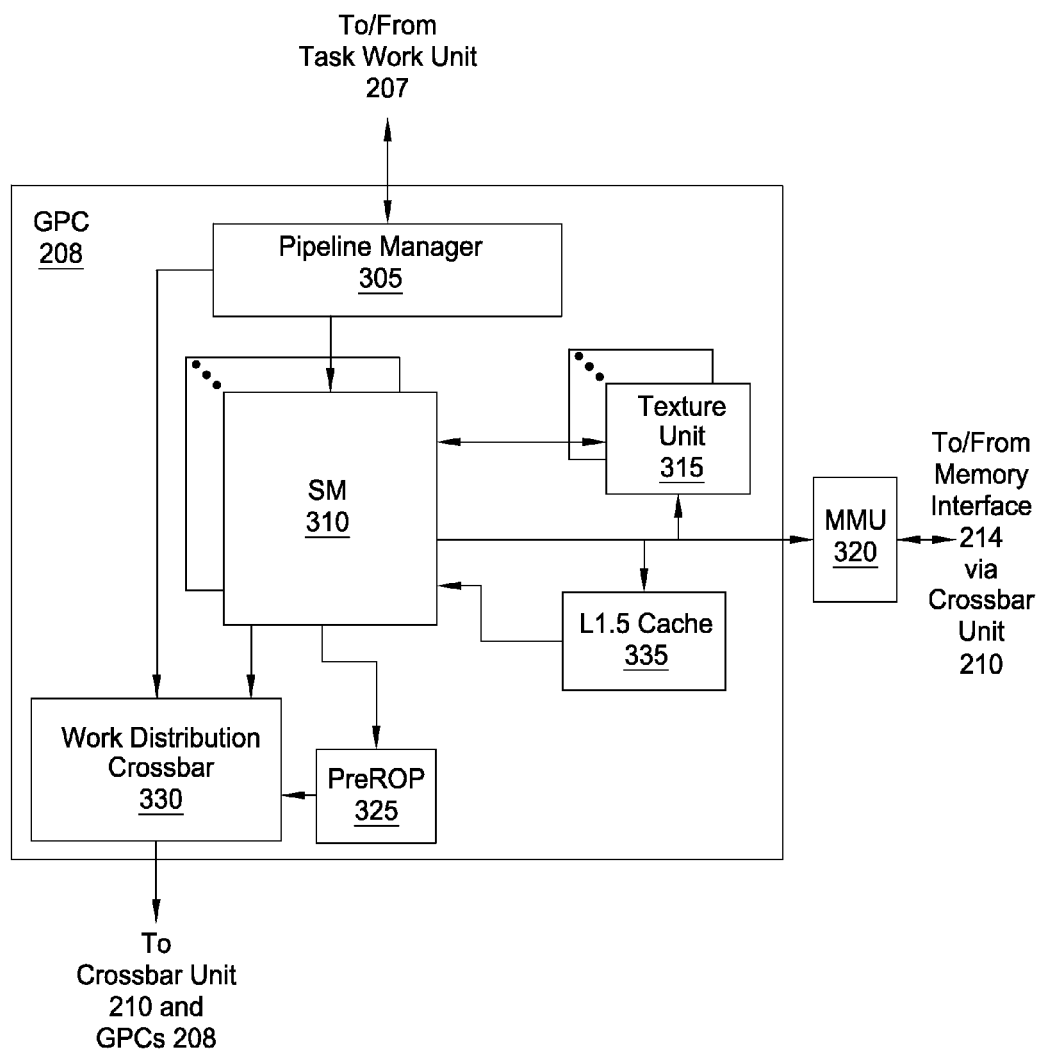
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Selective Power Gating to Extend the Life of Sleep FETs

Many of the processing elements within computer system 100 described thus far may be configured to implement DVFS in order to scale voltage and clock frequency based on available power and/or power requirements. For example, CPU 102 of FIG. 1 may be configured to scale voltage and clock frequency to support different modes of operation, including a high-performance mode, a low-power mode, or a sleep mode, among others. In addition, many of the processing elements discussed herein may also be power gated in order to prevent leakage during idle cycles. For example, CPU 102 may be gated off at times when operation is not required, thereby preventing leakage and conserving power. PPU 202 of FIG. 2, and elements within PPU 202, may be configured in similar fashion to CPU 102.

A given processing element configured to implement DVFS in conjunction with power gating techniques may be coupled to one or more power-gating arrays (e.g., a header and/or a footer) configured to isolate the processing element from a power source or ground. A power-gating array within computer system 100 may be configured to selectively enable only a subset of sleep FETs within that array, leaving the other sleep FETs disabled, and to toggle only the enabled subset of sleep FETs to implement power gating. The number of enabled sleep FETs may be configured based on the current operating mode of the processing element to which the array is coupled. With this approach, the average usage of sleep FETs within a power-gating array may be reduced, thereby extending the lifetime of those FETs. For a given operating mode, the active subset may be rotated amongst all available sleep FETs, thereby distributing the usage of sleep FETs more or less evenly. Various techniques for implementing the aforementioned functionality are described in greater detail below in conjunction with FIGS. 4-8.

Figure 4:
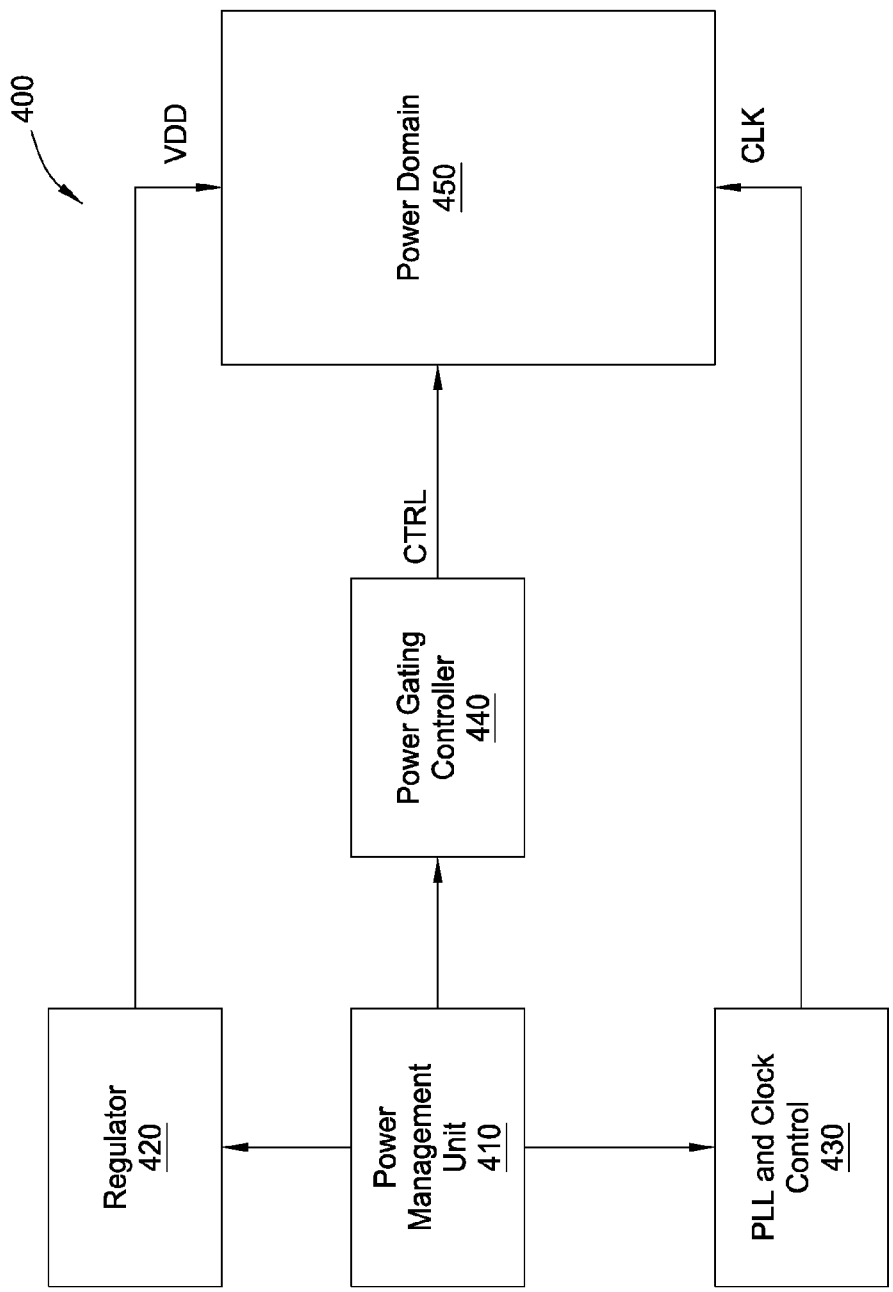
FIG. 4 is a block diagram of a subsystem configured to supply power to a power domain, according to one embodiment of the present invention.

FIG. 4 is a block diagram of a subsystem 400 configured to supply power to a power domain 450, according to one embodiment of the present invention. Power domain 450 may represent any portion of computer system 100 that consumes power and resides on a dedicated power rail, including individual processing elements and/or collections of processing elements. For example, power domain 450 could include one or more CPUs (such as CPU 102), one or more PPUs (such as PPU 202), one or more elements within those processing units, and so forth. As shown, subsystem 400 includes a power management unit 410 coupled to a regulator 420, a phase-locked loop (PLL) and clock control 430, and a power-gating controller 440. Regulator 420, PLL and clock control 430, and power gating control 440 are coupled to power domain 450. Subsystem 400 may be configured to implement any technically feasible approach to DVFS in order to supply a variable voltage and a variable-frequency clock signal to power domain 450.

Power management unit 410 is configured to draw power from a power supply (not shown) and to determine an amount of voltage to be supplied to power domain 450. For example, when power domain 450 operates in a low power mode, power management unit 410 could determine that power domain 450 should be supplied with a lower voltage. Conversely, when power domain 450 operates in a high performance mode, power management unit 410 could determine that power domain 450 should be supplied with a higher voltage. Regulator 420 is configured to regulate power provided by power management unit 410 in order to supply the needed voltage level to power domain 450.

PLL and clock control 430 is configured to generate a clock signal that drives logic blocks within power domain 450 (not shown here). The frequency of the clock signal generated by PLL and clock control 430 generally reflects the voltage level supplied to power domain 450. For example, when power domain 450 operates with a lower voltage level, PLL and clock control 430 would generate a clock signal with a lower frequency. Conversely, when power domain 450 operates with a higher voltage level, PLL and clock control 430 would generate a clock signal with a higher frequency. As a general matter, power management unit 410, regulator 420, and PLL and clock control 430 are configured to interoperate with one another to implement DVFS techniques on behalf of logic blocks within power domain 450.

Power gating controller 440 is configured to issue control signals to power domain 450 that cause power domain 450 to gate off logic blocks within that domain under certain circumstances. For example, in situations where a given logic block within power domain 450 is idle, power gating controller 440 could gate off that logic block to prevent leakage. Power domain 450 includes specialized power gating arrays (i.e., headers and/or footers) that can be selectively configured to gate off logic blocks in response to command signals generated by power gating controller 440, as described in greater detail below in conjunction with FIG. 5.

Figure 5:
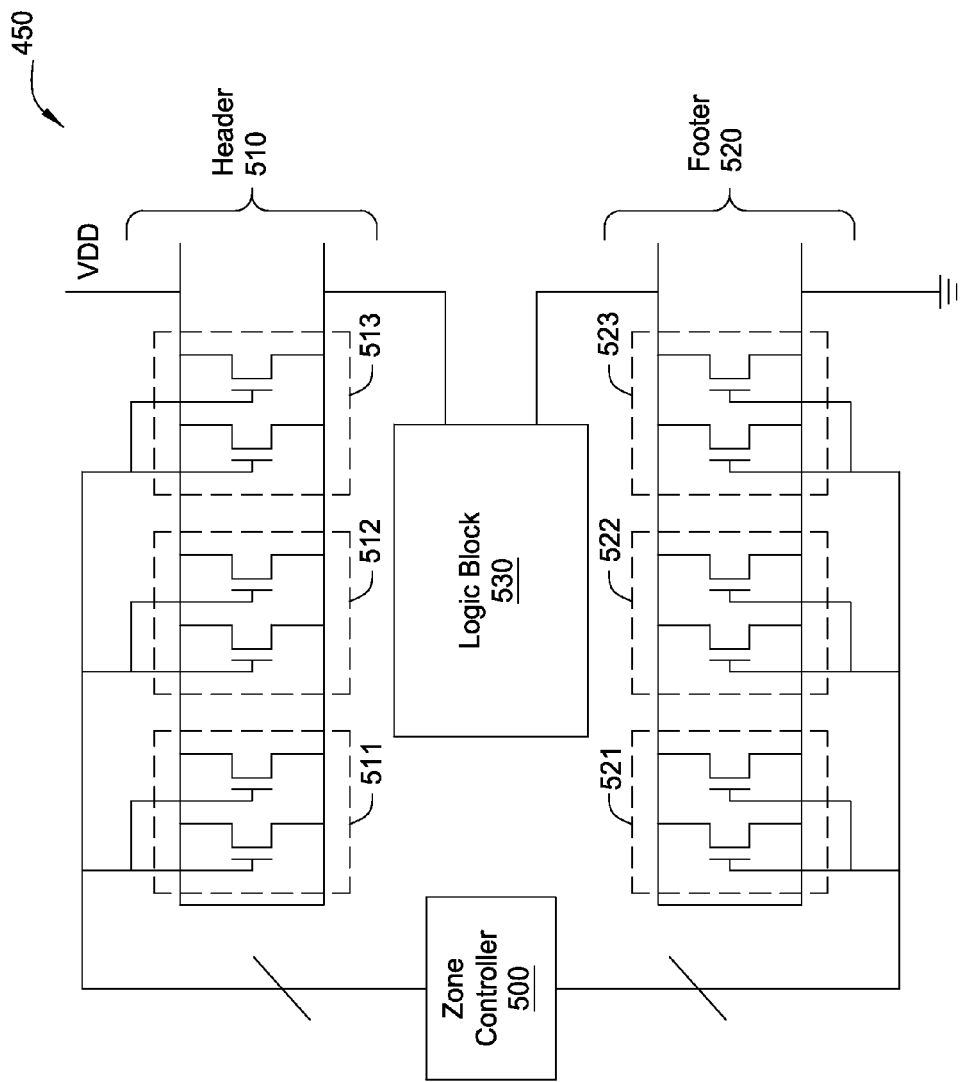
FIG. 5 is a more detailed block diagram of the power domain of FIG. 4, according to one embodiment of the present invention.

FIG. 5 is a more detailed block diagram of power domain 450 of FIG. 4, according to one embodiment of the present invention. As shown, power domain 450 includes a zone controller 500, a header 510, a footer 520, and a logic block 530. Zone controller 500 is coupled to header 510 and footer 520. Header 510 is coupled to logic block 530 and configured to conduct power to logic block 530. Footer 520 is also coupled to logic block 530 and configured to provide a ground path for logic block 530.

Header 510 includes a plurality of p-channel sleep FETs that are grouped into zones 511, 512, and 513. The sleep FETs within each zone of header 510 may be independently enabled in order to implement power gating on behalf of logic block 530. Similarly, footer 520 includes a plurality of n-channel sleep FETs that are grouped into zones 521, 522, and 523. The sleep FETs within each zone of footer 520 may also be independently enabled in order to implement power gating on behalf of logic block 530. When a given zone of header 510 or footer 520 is enabled, the sleep FETs within the enabled zone may be toggled on and off to perform power gating. The other sleep FETs within the enabled zone are disabled and not used to perform power gating, thereby reducing the usage of those sleep FETs. Header 510 and footer 520 are shown in FIG. 5 with a specific number of zones for exemplary purposes only. The techniques described herein may be practiced with power-gating array having any number of zones.

Zone controller 500 is configured to selectively enable a particular number of zones within header 510 and footer 520 depending on the current operating mode of logic block 530. For example, when logic block 530 operates in a low power mode, zone controller 500 may enable a low number of zones within header 510 and enable a low number of zones within footer 520. Conversely, when logic block 530 operates in a high-performance mode, zone controller 500 may enable many zones within header 510 and many zones within footer 520. Generally, the number of zones enabled for a given operating mode is an arbitrary function of the voltage needed to support that operating mode.

Zone controller 500 may selectively enable zones of header 510 and footer 520 in the fashion described above because not all sleep FETs within header 510 and footer 520 are needed to support power gating for a given voltage level. As a general principle of power gating, the parallel architecture of sleep FETs within header 510 and footer 520 induces a minimal voltage drop that supports the maximum voltage with which logic block 530 may operate. However, when logic block 530 does not operate with that maximum voltage, and, instead, operates with a lower voltage (and correspondingly lower current), a voltage drop that supports the lower voltage level may be accomplished with fewer parallel FETs. Accordingly, zone controller 500 is configured to disable the sleep FETs within certain zones depending on the voltage consumed by logic block 530.

An important consequence of this functionality is that sleep FETs within disabled zones of header 510 and footer 520 are not toggled on and off during normal power gating, and so those FETs are not subject to usage that would otherwise cause deterioration and eventual failure. Thus, the overall lifetime of the sleep FETs within header 510 and footer 520 may be extended.

Zone controller 500 may also rotate which zones are enabled, thereby distributing sleep FET usage uniformly across each zone. For example, zone controller 500 could select zones 511 and 521 to be active during a first time interval, select zones 512 and 522 to be active during a second time interval, and select zones 513 and 523 to be active during a third time interval. Persons skilled in the art will recognize that zone controller 500 may implement any technically feasible approach to scheduling the enablement of zones, including a round-robin scheduling technique, a uniform random approach, and so forth. Further, those skilled in the art will recognize that the scheduling policy zone controller 500 implements for header 510 and footer 520 need not be the same, and that zone controller 500 may implement different scheduling policies for header 510 and footer 520.

Further, zone controller 500 may monitor the usage of each zone of header 510 and footer 520 over time, and then schedule zones for enablement based on the total usage of those zones over time. For example, zone controller 500 could record the number of times the sleep FETs within each zone have toggled, and then selectively enable certain zones to maintain a relatively consistent number of toggles across all zones. Zone controller 500 may also record diagnostic information associated with each zone that reflects the degree to which the sleep FETs in each zone are deteriorating. Then, zone controller 500 could prioritize the enablement zones with low sleep FET deterioration over the enablement of zones with higher sleep FET deterioration.

Referring generally to FIGS. 4-5, subsystem 400 is configured to implement DVFS in conjunction with power gating techniques in a manner that reduces the deterioration of sleep FETs. With this approach, logic block 530 may operate in a variety of different modes of operation without causing excessive deterioration of sleep FETs. The various operating modes of logic block 530 are described in greater detail below in conjunction with FIG. 6.

Figure 6:
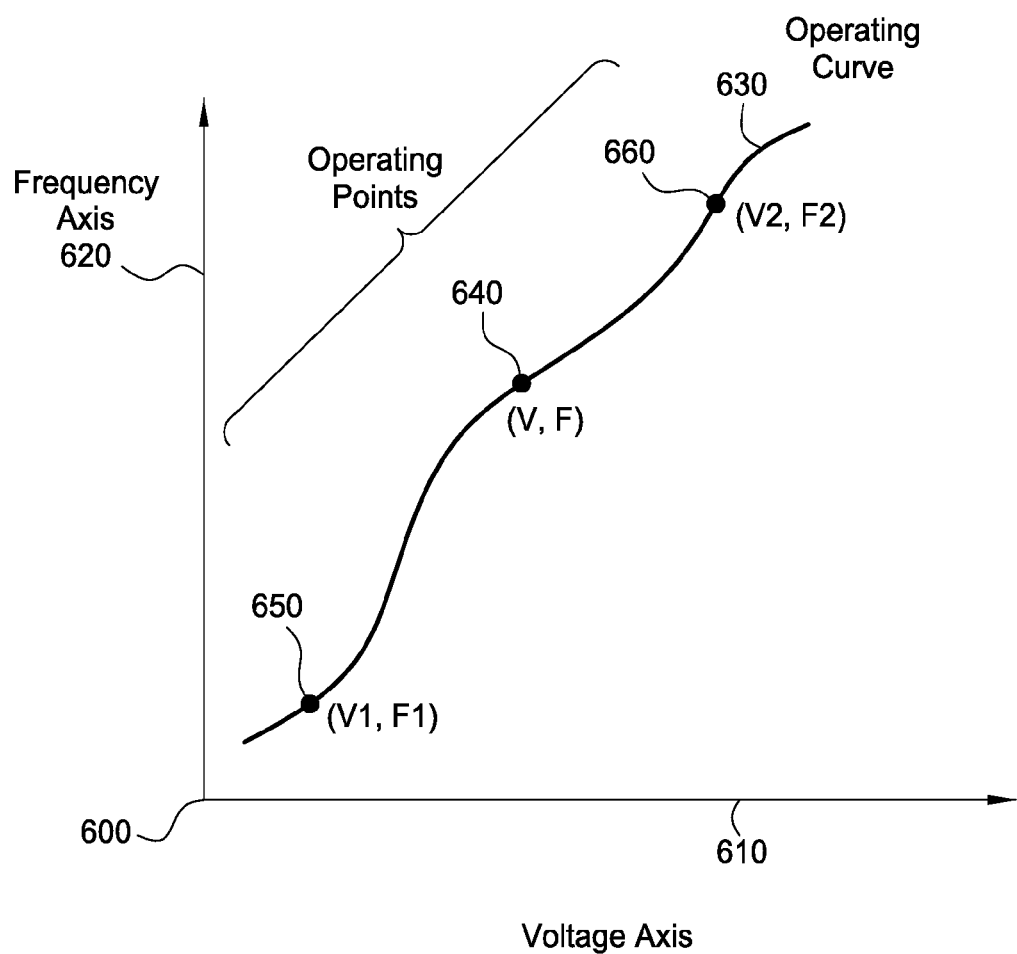
FIG. 6 is a voltage-frequency plot that illustrates different operating points associated with the power domain of FIGS. 4-5, according to one embodiment of the present invention.

FIG. 6 is a voltage-frequency plot 600 that illustrates different operating points associated with the power domain 450 of FIGS. 4-5, according to one embodiment of the present invention. As shown, voltage-frequency plot 600 includes a voltage axis 610 and a frequency axis 620. An operating curve 630 is plotted against voltage axis 610 and frequency axis 620. Operating curve 630 reflects different operating points at which logic block 530 may operate when subsystem 400 implements DVFS. For example, logic block 530 may operate at operating point 640 that represents a nominal operating mode, operating point 650 that represents a low power mode, or operating point 660 that represents a high performance mode.

At operating point 650, logic block 530 operates with a lower voltage level and a clock signal having a lower frequency. At operating point 660, logic block 530 operates with a higher voltage level and clock signal having a higher clock frequency. When logic block 530 migrates to a given operating point on operating curve 600, zone controller 500 selectively enables specific subsets of zones within header 510 and 520 depending on the voltage level associated with that operating point.

For example, when logic block 530 migrates to operating point 650, zone controller 500 could selectively enable only a small fraction of the zones within header 510 and a small fraction of the zones within footer 520. When logic block 530 migrates to operating point 660, zone controller 500 could then selectively enable a larger fraction of the zones within header 510 and a larger fraction of the zones within footer 520. For a given operating point, zone controller 500 may also rotate the particular zones that are active in header 510 and/or footer 520, while still maintaining a given number of enabled zones. As mentioned above, zone controller may implement a wide variety of techniques for scheduling which zones should be enabled at any given time.

With the techniques described thus far, zone controller 500 decreases the usage of sleep FETs within header 510 and footer 520 over time, thereby reducing the deterioration of those FETs. Since not all sleep FETs are needed to support power gating for a given voltage level of logic block 530, the techniques described thus far support the voltage specifications associated with pre-existing DVFS techniques. The functionality of subsystem 400, including zone controller 500, are described in stepwise fashion below in conjunction with FIGS. 7-8.

Figure 7:
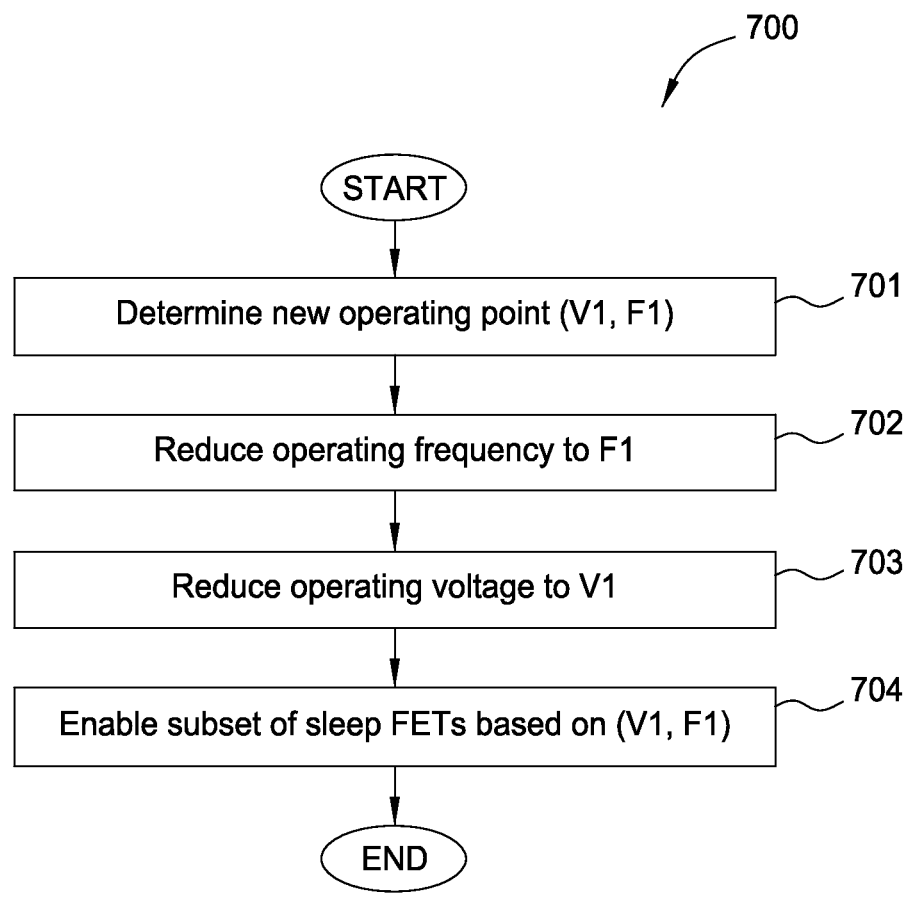
FIG. 7 is a flow diagram of method steps for selectively enabling sleep FETs in a power-gating array when reducing the voltage supplied to a power domain, according to one embodiment of the present invention.

FIG. 7 is a flow diagram of method steps for selectively enabling sleep FETs in a power-gating array when reducing the voltage supplied to a power domain, according to one embodiment of the present invention. Although the method steps are described in conjunction with the systems of FIGS. 1-6, persons skilled in the art will understand that any system configured to perform the method steps, in any order, is within the scope of the present invention.

As shown, a method 700 begins at step 701, where logic block 530 within power domain 450 determines a new operating point (V1, F1). The new operating point could be, e.g., operating point 650 of FIG. 6. Logic block 530 may operate in conjunction with power management unit 410 of FIG. 4 to identify operating point (V1, F1) based on an available amount of power, or operate within another unit configured to manage the operating state of logic block 530. At step 702, PLL and clock control 420 of FIG. 4 reduces the clock frequency of logic block 530 to F1. At step 703, regulator 420 of FIG. 4 reduces the voltage supplied to logic block 530 to V1.

At step 704, zone controller 500 of FIG. 5 enables a subset of sleep FETs within header 510 and/or footer 520 based on the new operating point (V1, F1) and disables the other sleep FETs. In practice, zone controller 500 need only enable a number of sleep FETs within header 510 and/or footer 520 that allows logic block 530 to operate at voltage V1, i.e. without inducing a significant voltage drop. When voltage V1 corresponds to a low-power mode of logic block 530, zone controller 500 may enable a small fraction of the zones within header 510 and/or footer 520. The method 700 then ends.

Figure 8:
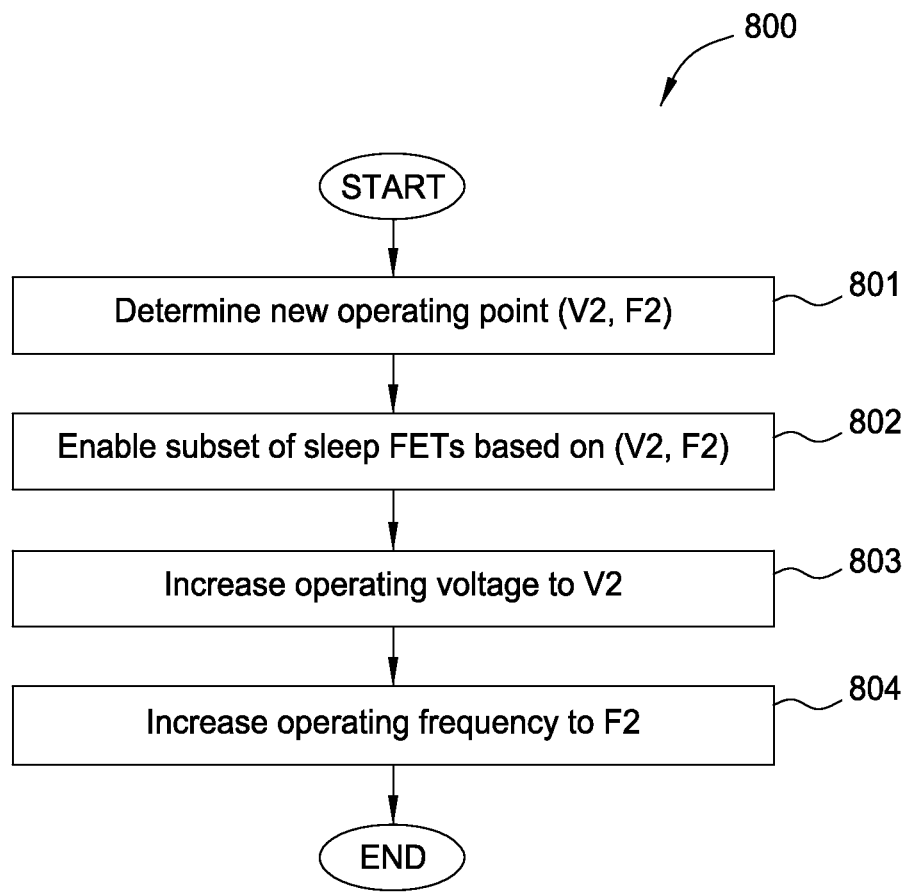
FIG. 8 is a flow diagram of method steps for selectively enabling sleep FETs in a power-gating array when increasing the voltage supplied to a power domain, according to one embodiment of the present invention.

FIG. 8 is a flow diagram of method steps for selectively enabling sleep FETs in a power-gating array when increasing the voltage supplied to a power domain, according to one embodiment of the present invention. Although the method steps are described in conjunction with the systems of FIGS. 1-6, persons skilled in the art will understand that any system configured to perform the method steps, in any order, is within the scope of the present invention.

As shown, a method 800 begins at step 801, where logic block 530 within power domain 450 determines a new operating point (V2, F2). The new operating point could be, e.g., operating point 660 of FIG. 6. As with step 701 of the method 700, logic block 530 may operate in conjunction with power management unit 410 of FIG. 4 or another unit to identify operating point (V2, F2) when performing step 801.

At step 802, zone controller 500 of FIG. 5 enables a subset of sleep FETs within header 510 and/or footer 520 based on the new operating point (V2, F2) and disables the other sleep FETs. In practice, zone controller 500 need only enable a number of sleep FETs within header 510 and/or footer 520 that allows logic block 530 to operate at voltage V2, i.e. without inducing a significant voltage drop. When voltage V2 corresponds to a high-performance mode of logic block 530, zone controller 500 may enable a large fraction of the zones within header 510 and/or footer 520.

At step 803, regulator 420 of FIG. 4 increases the voltage of power supplied to logic block 530 to V2. At step 804, PLL and clock control 420 of FIG. 4 increases the clock frequency of logic block 530 to F2. The method 800 then ends.

Referring collectively to FIGS. 7 and 8, subsystem 400 and zone controller 500 may implement the methods 700 or 800 in order to scale the voltage and frequency of logic block 530 down or up, respectively. In doing so, the number of sleep FETs needed to implement power gating may also be scaled down or up, thereby reducing the overall usage of those FETs over time and potentially decreasing deterioration.

Persons skilled in the art will recognize that the techniques described thus far may be applicable to configurations of subsystem 500 that include just one power-gating array within power domain 450. For example, power domain 450 could include header 510 coupled to logic block 530, and footer 520 could be omitted. Alternatively, power domain 450 could include footer 520 coupled to logic block 530, and header 510 could be omitted. As a general matter, the selective power gating techniques described above in conjunction with FIGS. 4-7 may be applied to any array of sleep FETs.

In sum, a power-gating array configured to power gate a logic block includes multiple zones of sleep field-effect transistors (FETs). A zone controller coupled to the power gating array selectively enables a certain number of zones within the array depending on the voltage drawn by the logic block. When the logic block draws a lower voltage, the zone controller enables a lower number of zones. When the logic block draws a higher voltage, the zone controller enables a greater number of zones.

One advantage of the disclosed technique is that sleep FET usage is reduced, thereby countering the effects of FET deterioration due to BTI and TDDB. Accordingly, the lifetime of sleep FETs configured to perform power gating for logic blocks may be extended. Further, the disclosed techniques support pre-existing DVFS approaches, since power-gating arrays may be configured to support a variety of voltage levels drawn by those logic blocks.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for power gating a logic block, the method comprising:
adjusting an operating voltage associated with the logic block to a first voltage level;
enabling a first subset of switching elements included in a set of switching elements that is coupled to the logic block based on the first voltage level;
disabling one or more switching elements that are included in the set of switching elements but not included in the first subset of switching elements; and
toggling the first subset of switching elements to power gate the logic block between the first voltage level and zero voltage.

2. The computer-implemented method of claim 1, further comprising:
adjusting the operating voltage associated with the logic block from the first voltage level to a second voltage level;
enabling a second subset of switching elements included in a set of switching elements based on the second voltage level;
disabling one or more switching elements that are included in the set of switching elements but not included in the second subset of switching elements; and
toggling the second subset of switching elements to power gate the logic block between the second voltage level and zero voltage.

3. The computer-implemented method of claim 2, wherein the first voltage level is less than the second voltage level, and the first subset of switching elements includes fewer switching elements than the second subset of switching elements.

4. The computer-implemented method of claim 2, wherein the first voltage level is greater than the second voltage level, and the first subset of switching elements includes more switching elements than the second subset of switching elements.

5. The computer-implemented method of claim 1, further comprising:
disabling the first subset of switching elements;
determining a second subset of switching elements that should be enabled, wherein the first subset of switching elements and the second subset of switching elements include a substantially similar number of switching elements; and
enabling the second subset of switching elements.

6. The computer-implemented method of claim 5, wherein determining the second subset of switching elements that should be enabled comprises executing a scheduling policy to select between different subsets of switching elements included in the set of switching elements.

7. The computer-implemented method of claim 5, wherein determining the second subset of switching elements that should be enabled comprises identifying switching elements in the set of switching elements that have been used less than other switching elements included in the set of switching elements.

8. The computer-implemented method of claim 1, wherein the set of switching elements comprises a header power gating array, and at least one switching element included in the first subset of switching elements comprises a p-channel field-effect transistor.

9. The computer-implemented method of claim 1, wherein the set of switching elements comprises a footer power gating array, and at least one switching element included in the first subset of switching elements comprises an n-channel field-effect transistor.

10. A subsystem configured to power gate logic blocks, comprising:
   a logic block;
   a set of switching elements coupled to the logic block and configured to conduct an operating voltage to the logic block;
   a regulator coupled to the set of switching elements and configured to adjust the operating voltage to a first voltage level;
   a zone controller coupled to the set of switching elements and configured to:
      enable a first subset of switching elements included in the set of switching elements based on the first voltage level, and
      disable one or more switching elements that are included in the set of switching elements but not included in the first subset of switching elements; and
   a power gating controller coupled to the set of switching elements and configured to toggle the first subset of switching elements to power gate the logic block between the first voltage level and zero voltage.

11. The subsystem of claim 10, wherein:
   the regulator is further configured to adjust the operating voltage from the first voltage level to a second voltage level;
   the zone controller is further configured to:
      enable a second subset of switching elements included in a set of switching elements based on the second voltage level, and
      disable one or more switching elements that are included in the set of switching elements but not included in the second subset of switching elements; and
   the power-gating controller is further configured to toggle the second subset of switching elements to power gate the logic block between the second voltage level and zero voltage.

12. The subsystem of claim 11, wherein the first voltage level is less than the second voltage level, and the first subset of switching elements includes fewer switching elements than the second subset of switching elements.

13. The subsystem of claim 11, wherein the first voltage level is greater than the second voltage level, and the first subset of switching elements includes more switching elements than the second subset of switching elements.

14. The subsystem of claim 10, wherein the zone controller is further configured to:
   disable the first subset of switching elements;
   determine a second subset of switching elements that should be enabled, wherein the first subset of switching elements and the second subset of switching elements include a substantially similar number of switching elements; and
   enable the second subset of switching elements.

15. The subsystem of claim 14, wherein the zone controller is configured to determine the second subset of switching elements that should be enabled by executing a scheduling policy to select between different subsets of switching elements included in the set of switching elements.

16. The subsystem of claim 14, wherein the zone controller is configured to determine the second subset of switching elements that should be enabled by identifying switching elements in the set of switching elements that have been used less than other switching elements included in the set of switching elements.

17. The subsystem of claim 10, wherein the set of switching elements comprises a header power gating array, and at least one switching element included in the first subset of switching elements comprises a p-channel field-effect transistor.

18. The subsystem of claim 10, wherein the set of switching elements comprises a footer power gating array, and at least one switching element included in the first subset of switching elements comprises an n-channel field-effect transistor.

19. A computing device configured to power gate logic blocks, comprising:
   a logic block;
   a set of switching elements coupled to the logic block and configured to conduct an operating voltage to the logic block;
   a regulator coupled to the set of switching elements and configured to adjust the operating voltage to a first voltage level;
   a zone controller coupled to the set of switching elements and configured to:
      enable a first subset of switching elements included in the set of switching elements based on the first voltage level, and
      disable one or more switching elements that are included in the set of switching elements but not included in the first subset of switching elements; and
   a power gating controller coupled to the set of switching elements and configured to toggle the first subset of switching elements to power gate the logic block between the first voltage level and zero voltage.

20. The computing device of claim 19, wherein:
   the regulator is further configured to adjust the operating voltage associated with the logic block from the first voltage level to a second voltage level;
   the zone controller is further configured to:
      enable a second subset of switching elements included in a set of switching elements based on the second voltage level, and
      disable one or more switching elements that are included in the set of switching elements but not included in the second subset of switching elements; and
   the power-gating controller is further configured to toggle the second subset of switching elements to power gate the logic block between the second voltage level and zero voltage.

* * * * *